April 19, 1966    T. G. W. BRACKMANN ETAL    3,246,792
PLASTIC COVER FOR PRESS-IN COVER CANS Filed Sept. 18, 1963    3 Sheets-Sheet 1

INVENTORS
THEODOR GERHARD WILLI BRACKMANN
& EBERHARD SIEGFRIED LIEBERT

BY
ATTORNEYS

April 19, 1966  T. G. W. BRACKMANN ET AL  3,246,792
PLASTIC COVER FOR PRESS-IN COVER CANS
Filed Sept. 18, 1963  3 Sheets-Sheet 2
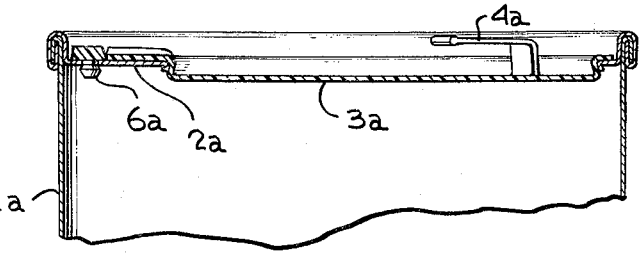
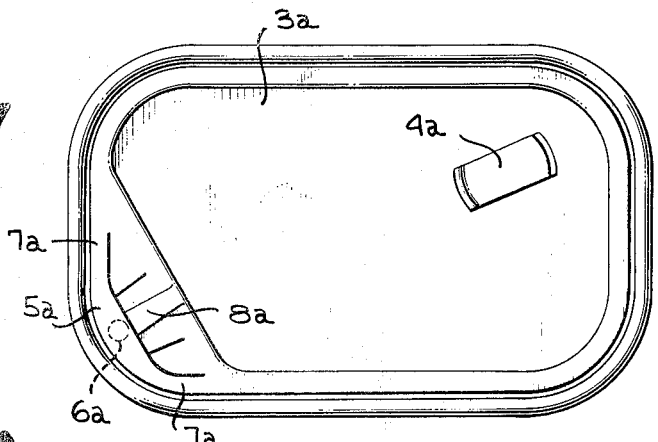
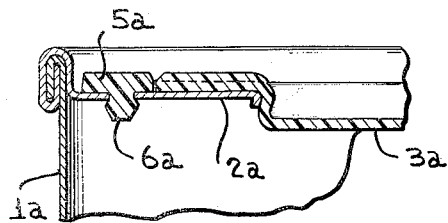
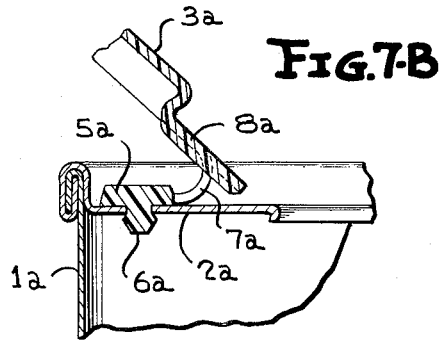
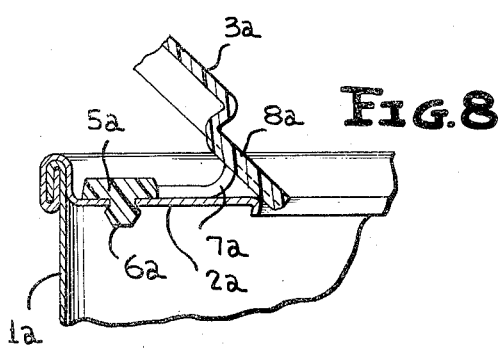
INVENTORS
THEODOR GERHARD WILLI BRACKMANN
& EBERHARD SIEGFRIED LIEBERT
BY
ATTORNEYS April 19, 1966 T. G. W. BRACKMANN ET AL 3,246,792
PLASTIC COVER FOR PRESS-IN COVER CANS
Filed Sept. 18, 1963 3 Sheets-Sheet 3
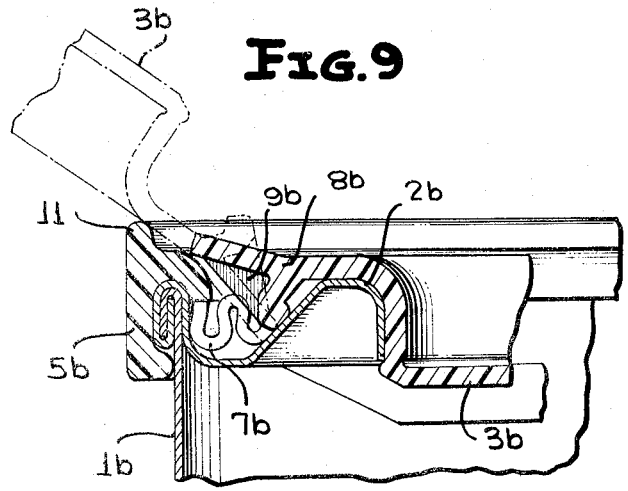
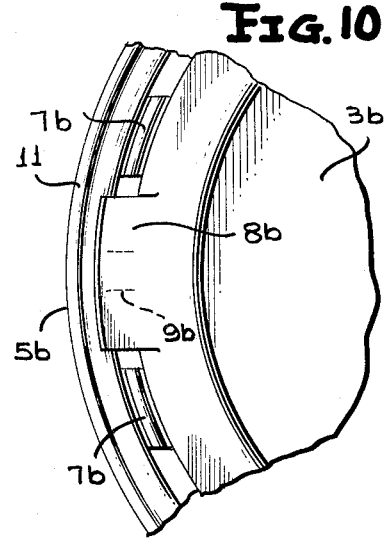
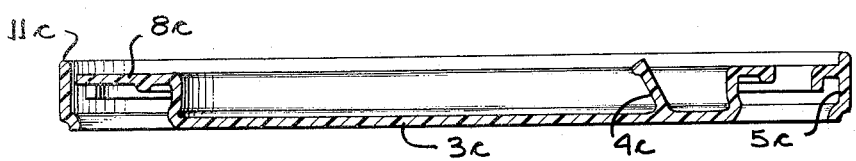
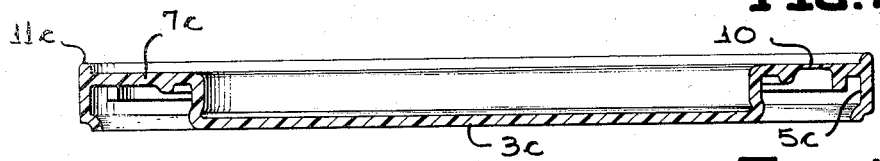
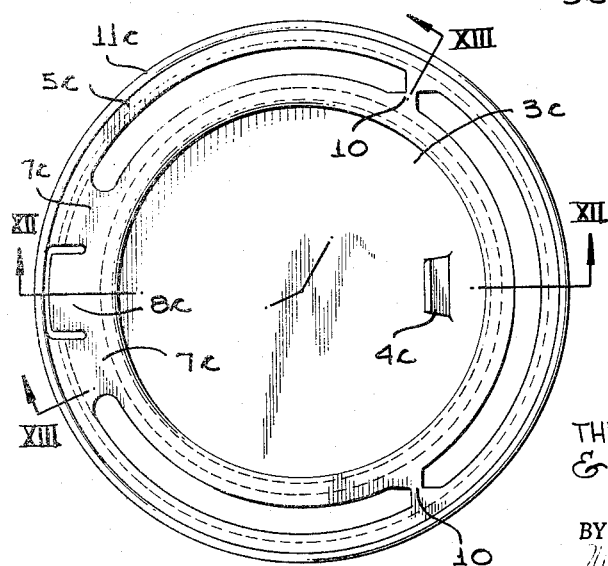
INVENTORS
THEODOR GERHARD WILLI BRACKMANN
& EBERHARD SIEGFRIED LIEBERT
BY
ATTORNEYS

United States Patent Office

3,246,792
Patented Apr. 19, 1966

3,246,792
PLASTIC COVER FOR PRESS-IN COVER CANS
Theodor Gerhard Willi Brackmann, Braunschweig, and
Eberhard Siegfried Liebert, Hamburg-Bergedorf, Germany, assignors to J. A. Schmalback Aktiengesellschaft, Braunschweig, Germany
Filed Sept. 18, 1963, Ser. No. 309,686
Claims priority, application Germany, Sept. 20, 1962, Sch 32,062
13 Claims. (Cl. 220—31)

This invention concerns a plastic cover for press-in cover cans.

It is known in the manufacture of containers in the form of cans or the like of various materials, such as sheet metal, pasteboard or even from plastic, to provide the containers with press-in covers, and fit the same with a cover, which likewise consists of plastic. Such press-in covers consisting of plastic are used, in particular, for coffee cans, tea cans or the like, from which the contents are to be taken each time in portions, importance being attached to the tight sealing of the container. The plastic cover, because of its nature of being readily deformable, can be put on and removed without the exertion of great force.

In containers intended for receiving contents to be removed in portions, it is desirable that the plastic cover not only be easily put on and removed, but also that it be so attached to the container that it may not be laid aside as a detached part each time the container is opened. On the other hand, the cover should not, after opening, hinder access to the inside of the container.

The problem sought to be solved by this invention is that of designing a plastic cover for press-in cans, so that it meets the above mentioned requirements.

In the solution of this problem, the herein disclosed invention provides that the press-in part of the cover is connected with a cover rim to be fastened to the cover ring of the can, through at least one hinge strip, and has at least one projecting tongue or flap means close to the hinge strip, which, when the cover is raised or opened, is supported on the cover ring of the can, holding the cover in the open position.

By this new design of the plastic cover, the end is gained that the cover is joined in hinged fashion to the cover rim fastened on the cover ring of the can, the tongue or flap means serving by its support on the cover ring when the cover is in the open or raised position, to oppose the tendency of the elastic hinge strips to bring the cover back to the closed position, thereby to hold the cover in the open position.

The tongue or flap means in its projecting length is so designed that in the raising or opening movement of the cover, with slight elastic deformation through bending of its free end, said flap means is placed against the cover ring in the zone of the opening rim in position to be supported there or against the cover ring. In the closing movement of the cover, the tongue or flap means is conversely brought back again into the original position, without hindering the closing process.

Preferably, two spaced hinge strips with a tongue or flap between them are provided, since in this way the cover, even in the open position, is held secure against twisting movements and only one tongue or flap is needed. However, it is quite possible to arrange between the press-in part of the cover and its rim just one hinged strip, and on each side of this hinged strip, a tongue or flap means, through which the cover may be properly supported in the open position.

To increase the supporting effect of the projecting flap or flaps, this invention also provides that the flap is reinforced as compared with the rest of the cover parts, or provided with ribs to increase resistance to bending.

A sure release of the opening rim of the cover ring is obtained, also, if cans are used on which the cover ring has somewhat the shape of a reclining S, and if, according to this invention, the hinged strip or strips are designed longer than corresponds to the distance between the press-in part and the rim of the cover, so that in the closed condition of the can, the hinged strips, laid together or in fold-like relation, are received in the circular depression which is formed by the cover ring and wherein, when the can is opened, the tongue or flap means are supported.

The secure and perfect opening and closing of the container by means of the press-in cover requires that the cover rim be securely joined with the cover ring so that the latter cannot fall away as a separate part and be lost. In cans or other containers which have a removal opening much smaller than the end surface, it is recommended that the cover rim of the press-in cover be joined with the cover ring through the medium of pressure knob means, for in such an arrangement only a relatively narrow cover rim on one side is necessary, the same being supported on the cover ring.

In another form of the invention, it is provided that the cover rim grips over the whole circumference of the can and is equipped with a stacking flange.

The cover may also be designed to constitute a safety or tamper-proof closure, if according to a further feature of the invention, the press-in part is connected with the cover rim not only by at least one hinge strip but also by one or more stays distributed around the circumference and which are readily rupturable in the first opening. These stays may be formed without difficulty in the production of the cover, so that no additional working step is required in forming the cover as a safety closure.

With the above and other objects in view that will hereinafter appear, the nature of the invention will be more clearly understood by reference to the following detailed description, the appended claims and the several views illustrated in the accompanying drawings.

In the drawings:

FIGURES 6 to 8 show, in a representation corresponding generally to that of FIGURES 1 to 5, another modified form and arrangement of the cover and the oblong can, in which FIGURES 7A, 7B and 8 correspond generally to FIGURES 3, 4 and 5, respectively.

FIGURE 9 shows an enlarged radial section through the upper part of a can with a cover, equipped with hinged strips different in design from those of FIGURES 1 to 8.

FIGURE 10 is a fragmentary plan view showing the parts illustrated in FIGURE 9.

FIGURE 11 is a plan view illustrating another form of the invention designed for the closing of cans with round cross section.

FIGURES 12 and 13 show sections through the closure arrangement shown in FIGURE 11, the sections being taken on the lines XII—XII and XIII—XIII, respectively.

Figure 1:
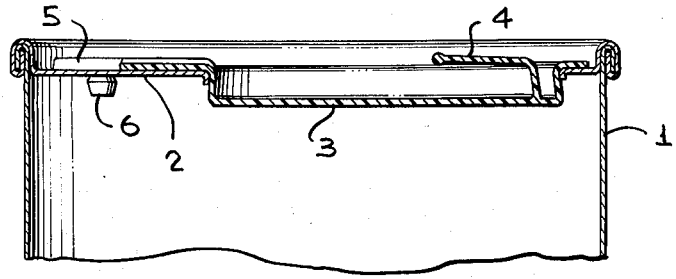
FIGURE 1 shows a section through the upper part of a can, oblong in general cross section, with a press-in cover designed according to the invention, and in which the access opening extends over only a part of the cross section area.

In all of the figures, 1 is the jacket or body of the can, to which the cover ring 2 is seam-secured or applied in other known manner. The press-in part of the cover is marked 3 in the figures. Connected with it is a flap 4 designed as a handle adapted to facilitate opening of the cover. The cover rim, always marked 6 in the figures, may have various forms and is connected through one or more hinge strips 7 with the press-in part 3. The tongue or flap also rigidly connected to the press-in part is marked 8 in all figures.

In the design according to FIGURES 1 to 5, a container 1 roughly oblong in cross section with the usual rounded corners is shown with a fitting cover in which the press-in part 3 engages in an opening which is small by comparison with the cross section of the container. The cover rim 5, as it appears particularly in FIGURE 2, consists merely of tongue-formed projections which are rigidly joined with the cover ring 2 through pressure-knob type heads 6. Between the parts 5 and the press-in part 3 of the cover lie the hinge strips 7, which in this example of embodiment are relatively wide, and between said strips are disposed the tongue or flap means 8 extending from the press-in part 3, said flap means 8 being provided with ribs 9 for reinforcement.

Figure 2:
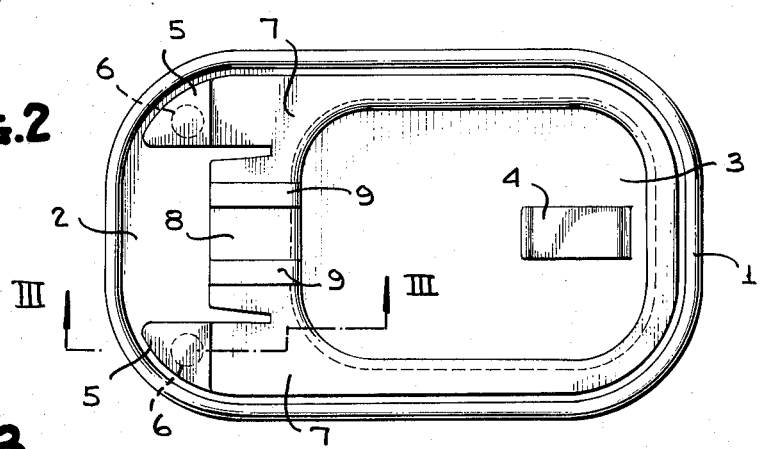
FIGURE 2 shows a top view of the cover according to FIGURE 1.
Figure 3:
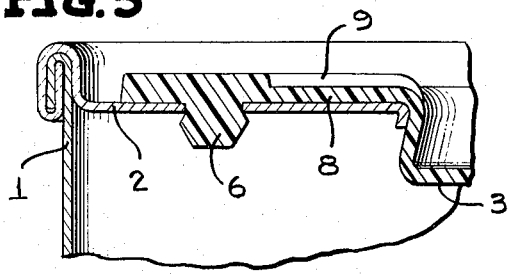
FIGURE 3 shows an enlarged fragmentary section along the line III—III in FIGURE 2.

In the closed condition of the can, shown in FIGURES 1 to 3, the press-in part engages within a radially projecting graduated rim into the opening of the cover ring and presses against the downwardly angled rim of the cover ring. The hinge strips 7 as well as the cover rim 5 and the tongue or flap means 8 extend over and lie on the cover ring 2.

Figure 4:
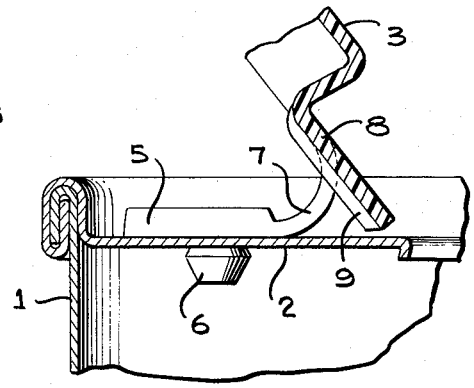
FIGURES 4 and 5 show the arrangement according to FIGURES 1 to 3, in different opening positions of the cover.
Figure 5:
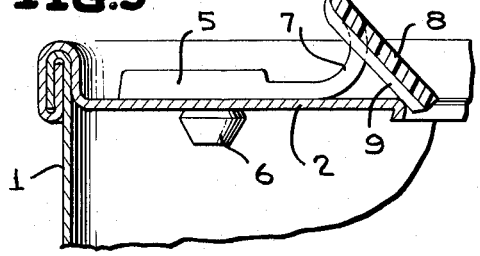

Upon opening the cover, the press-in part 3 is swung upward around the hinge strips 7 and brought into an open position such as is shown in FIGURE 4, in which position the hinge strips 7 because of their elastic deformability are brought into the illustrated arched position. The tongue or flap means 8 slides, in this upward opening motion of the cover or press-in part 3, between the hinge strips 7 and in the direction of the opening rim of the cover ring 2, being somewhat deformed, elastically, before reaching the position shown in FIGURE 4. Because of the elasticity of the hinge strips 7, said strips tend to move back again after the release or full opening of the cover part 3, again to assume their flat condition as shown in FIGURE 2. This movement is hindered, however, by the fact that the tongue or flap means 8 engages with and is supported on the cover ring and does not allow the cover to snap back. This support may be either as shown in FIGURE 4, on the upper surface of the cover ring 2, or, if because of the force exerted on the press-in part by the hinge strips 7, in the direction of the arrow 12, the cover tends to escape, a support may occur on the opening rim of the cover ring 2, as shown in FIGURE 5.

By the supporting of the cover against or upon the cover ring by means of the tongue or flap 8, the cover is held in the raised position, so that the opening of the can is freely accessible in spite of the permanent hinged attachment of the press-in cover.

The form or design of the can and cover shown in FIGURES 6 to 8, differs from the form previously described only by the fact that a larger opening to be closed by the press-in cover is provided, as compared with FIGURES 1 to 5. In these figures, parts serving like purposes as the parts shown in FIGURES 1 to 5 are given the same reference characters with added exponents *a*. As can be seen in FIGURE 7, the cover rim extends over only a small zone in one corner of the can, so that the press-in part $3^a$ of the cover is to be opened over the lower left corner as viewed in FIGURE 7, and in this case the attachment of the cover rim is provided by means of the pressure knob $6^a$ in the cover ring $2^a$. The detail sections in FIGURES 7A, 7B and 8 correspond generally to FIGURES 3, 4 and 5.

In the form or design shown in FIGURES 9 and 10 parts serving like purposes as the parts shown in FIGURES 1 to 5 are given the same characters with added exponents *b* and there is included a can $1^b$ with a cover ring $2^b$, which has an outer depression around its circumference, into which the hinge strips $7^b$ are received when the can is closed, as shown in FIGURE 9. In this case, the hinge strips $7^b$ are longer than the distance between the press-in part $3^b$ and the cover rim. In the closed condition of the can, which is represented in FIGURE 9 in solid lines, the tongue or flap means $8^b$ extends from the press-in part $3^b$ to the cover rim $5^b$ and rests thereon as shown. After lifting of the cover press-in part $3^b$ into the open position, as shown by the broken lines in FIGURE 9, said tongue or flap means $8^b$ engages in the circular depression of the cover ring and thus is supported in said open position. The cover rim $5^b$ in this form of the invention, is so shaped that it grips over the whole circumference of the can, forming a stacking rib or flange 11.

The other form of the cover shown in FIGURES 11 to 13 represents an especially simple design for industrial production. Here the cover and its press-in part are designed to form, at the same time, a safety or tamper-proof closure. The hinge strips $7^c$ are formed in simple fashion by the fact that a circumferential opening 13 is provided in manufacture (especially injection molding), between the press-in part $3^c$ and the cover rim $5^c$. This opening 13 is interrupted in the width of the hinge strips $7^c$, including the width of the tongue or flap means $8^c$. Further, between the cover rim $5^c$ and the press-in part $3^c$, connection stays 10 are provided, which are kept very narrow to make possible a readily effected "tearing open" of the cover by pulling on the flap or handle $4^c$. The flap or tongue means $8^c$ is defined by the arrangement of a correspondingly narrow opening 14, as clearly shown in FIGURES 11 and 12. The connection stays 10 are kept thin as compared with the thickness of the cover (see FIGURE 13 at right), while the tongue or flap means $8^c$ has a thickened design as compared with the other parts of the cover. Here again, a stacking rib or flange $11^c$ is provided formed by the cover rim.

It will be apparent that the cover shown in FIGURES 11 to 13 serves the same general purpose and functions in the same general manner described in connection with FIGURES 1 to 5 and 6 to 8. The flap or handle $4^c$ may be gripped to pull the press-in part $3^c$ of the cover out of the can opening in which it is received, at the same time rupturing the thin connecting stays 10 to free said cover part to swing up about the hinge strips $7^c$. When the cover part has been swung up to its open position it can be retained in that position by the supporting tongue or flap means $8^c$ in the manner previously described. See for example FIGURE 9.

In all of the designs or forms disposed herein it will be observed that each tongue or flap means will bend somewhat as the press-in cover is being swung up about its hinge strip means to its can access opening position, but when in this can opening process the free end of the flap means is freed from contact with the underlying cover ring of the can it will spring in toward the can cover access opening and into the general plane of the raised or opened cover so as to be in a position for engaging on the cover ring or in its access opening as a supporting prop effective to hold the cover in its open position.

We claim:

1. In a closure of the character described, the combination of a container body having a cover ring thereon and an access opening in said ring, a cover rim overlying the cover ring at least in part and secured thereto and having a press-in cover hinge-connected thereto and removably engageable as a closure in said access opening, the improvement comprising: flap means projecting from the press-in cover and positioned thereon for insertion into said access opening when the cover is swung up to an open position for engagement as a supporting prop with the cover rim to hold the cover in its open position.

2. Closure structure as defined in claim 1 wherein the flap means is flexible and has a free end portion disposed to bend against the cover ring as the cover is being raised and then spring free to assume its supporting prop contact position.

3. Closure structure as defined in claim 1 wherein the hinge connection of the cover with the cover rim is by means of two spaced hinge strips, and the flap means lies between said strips.

4. Closure structure as defined in claim 1 wherein the hinge connection of the cover with the cover rim is by means of two spaced hinge strips, and the flap means lies between said strips and is reinforced to offer resistance to bending and provide acceleration of its movement to its supporting prop contact position.

5. Closure structure as defined in claim 1 wherein the hinge connection of the cover with the cover rim is by means of two spaced hinge strips, and the flap means lies between said strips and has stiffening ribs thereon to offer resistance to bending prior to the releasing of contact of its free end with the cover ring during opening of the cover.

6. Closure structure as defined in claim 1 wherein the cover ring is seam secured on the body and the cover rim is snap mounted on the seam.

7. Closure structure as defined in claim 1 wherein the cover ring is seam secured on the body and the cover rim is snap mounted on the seam and has a stacking flange.

8. Closure structure as defined in claim 3 wherein the cover ring is seam secured on the body and the cover rim is snap mounted on the seam and has a circular recess therein in which the hinge strips lie when the cover is in its closed position, said strips being longer than corresponds to the distance between the pressed-in cover and the cover rim so as to lie in folds in said recess.

9. Closure structure as defined in claim 1 wherein the cover rim is secured to the cover ring by pressure-knob means.

10. Closure structure as defined in claim 1 wherein there are included readily rupturable stays securing the cover to the cover rim and subject to being ruptured to free the cover except for its hinge connection incidental to a first opening of the cover.

11. Closure structure as defined in claim 1 wherein the hinge connection of the cover with the cover rim is by means of two spaced hinge strips, and the flap means lies between said strips, and there are provided means including two pressure-knobs for securing the cover rim to the cover ring at the position of the hinge strips.

12. Closure structure as defined in claim 1 wherein the container body and the cover rim are generally oblong in outline, the cover rim is secured by pressure-knob means to the cover ring at one corner only thereof, and the hinge connection and the flap means are disposed in said corner.

13. In a closure of the character described, the combination of a container body having a cover ring thereon and an access opening in said ring, a cover rim overlying the cover ring at least in part and secured thereto and having a press-in cover hinge-connected thereto and removably engageable as a closure in said access opening, and flap means projecting from the press-in cover and positioned thereon to be effective when the cover is swung up to an open position to engage as a supporting prop with the cover rim to hold the cover in its open position, said container body being round, said cover ring being secured on the body and the cover rim being snap mounted on the seam, said rim having arcuate slots therein in part defining the press-in cover and which are interrupted to provide readily rupturable cover securing stays, said slots cooperating with flap means defining openings in setting out the hinge means, said stays being subject to being ruptured to free the cover except for its hinge connection incidental to a first opening of the cover.

References Cited by the Examiner
UNITED STATES PATENTS

| | | | |
|---|---|---|---|
| 2,524,191 | 10/1950 | Ettinger | 206—45.38 |
| 2,990,077 | 6/1961 | Van Baarn | 220—54 |
| 3,049,264 | 8/1962 | Morawski | 220—38.5 |
| 3,095,995 | 7/1963 | Foster | 220—31 |
| 3,106,311 | 10/1963 | Fairchild | 220—38.5 |
| 3,131,824 | 5/1964 | Van Baarn | 215—41 |

THERON E. CONDON, *Primary Examiner.*

GEORGE O. RALSTON, *Examiner.*